April 28, 1942. J. LOUMIET ET LAVIGNE 2,281,065
FLUID SEPARATION
Filed Dec. 17, 1936 5 Sheets-Sheet 1
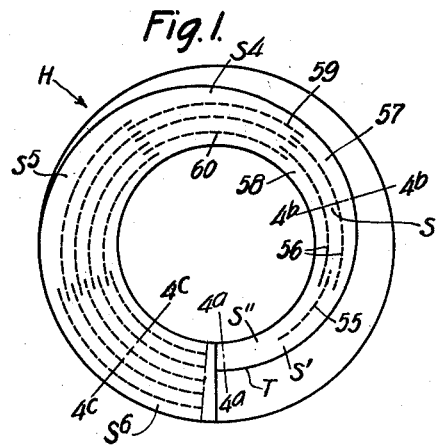
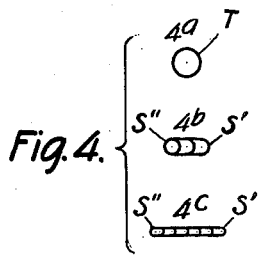
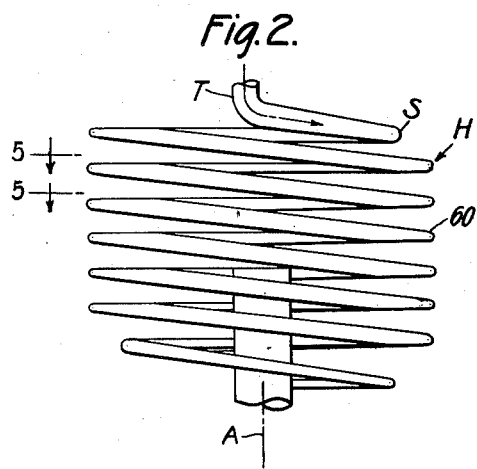
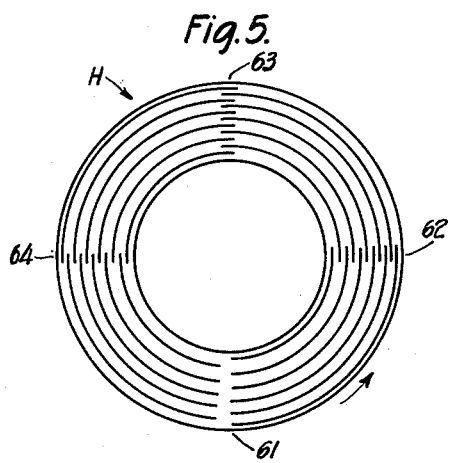
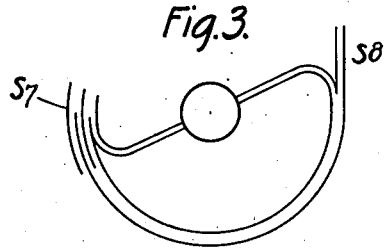
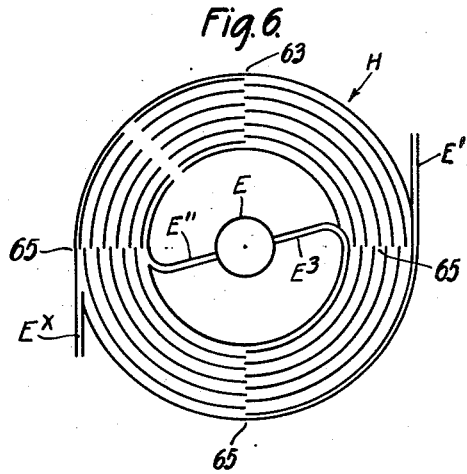
INVENTOR.
Jean Loumiet et Lavigne.
BY Moses & Nolte
ATTORNEYS April 28, 1942.  J. LOUMIET ET LAVIGNE  2,281,065
FLUID SEPARATION
Filed Dec. 17, 1936   5 Sheets-Sheet 2
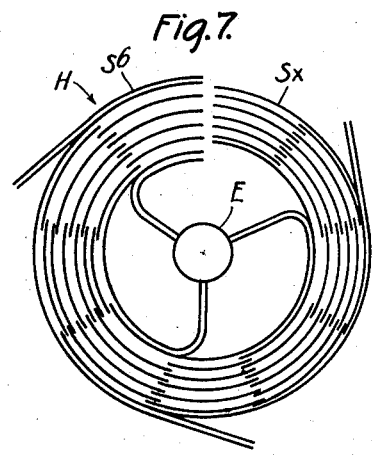
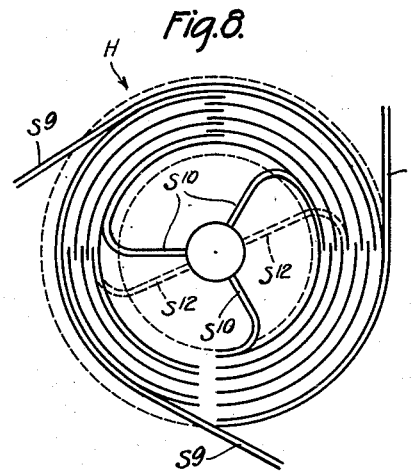
Fig. 13.
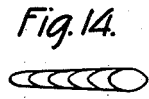
Fig. 14.
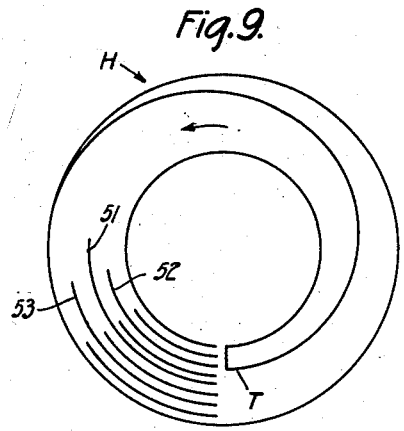
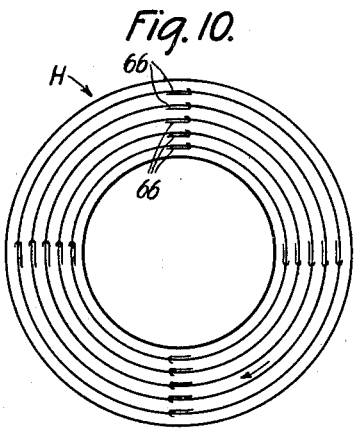
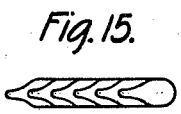
Fig. 15.
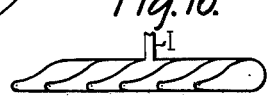
Fig. 16.
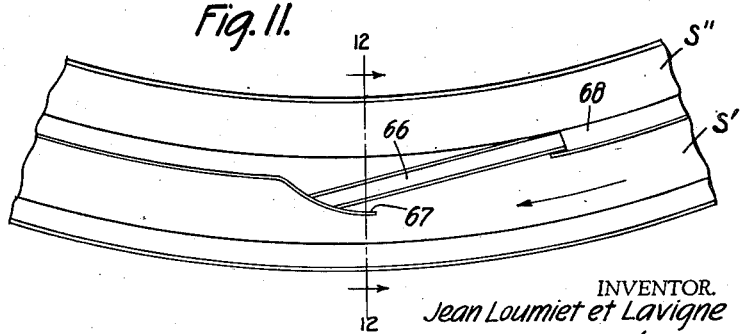
INVENTOR.
Jean Loumiet et Lavigne
BY Moses & Nolte
ATTORNEYS

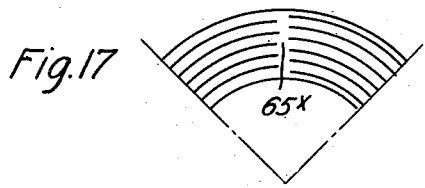
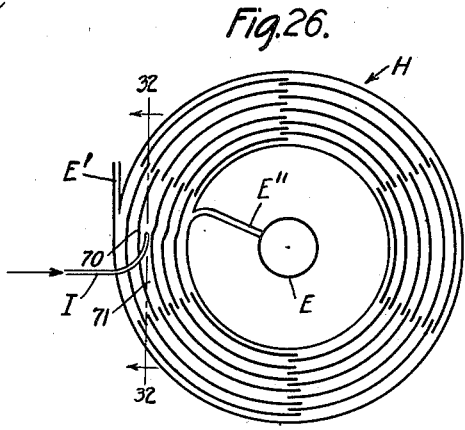
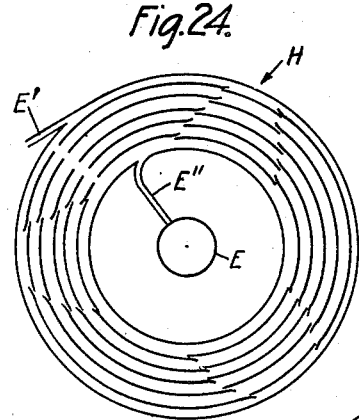
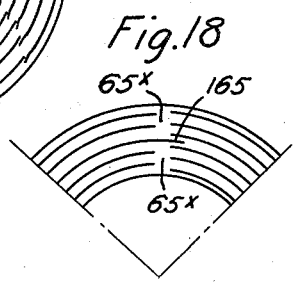
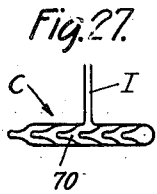
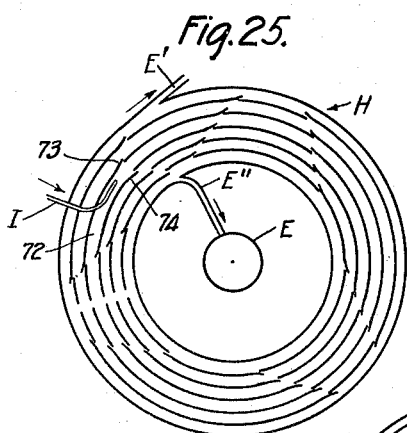
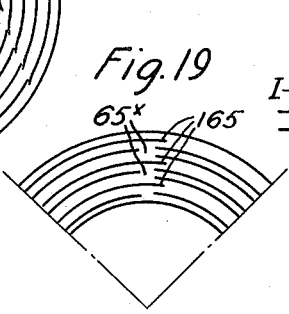
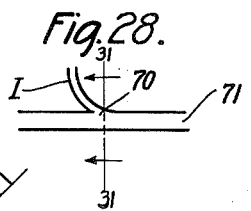

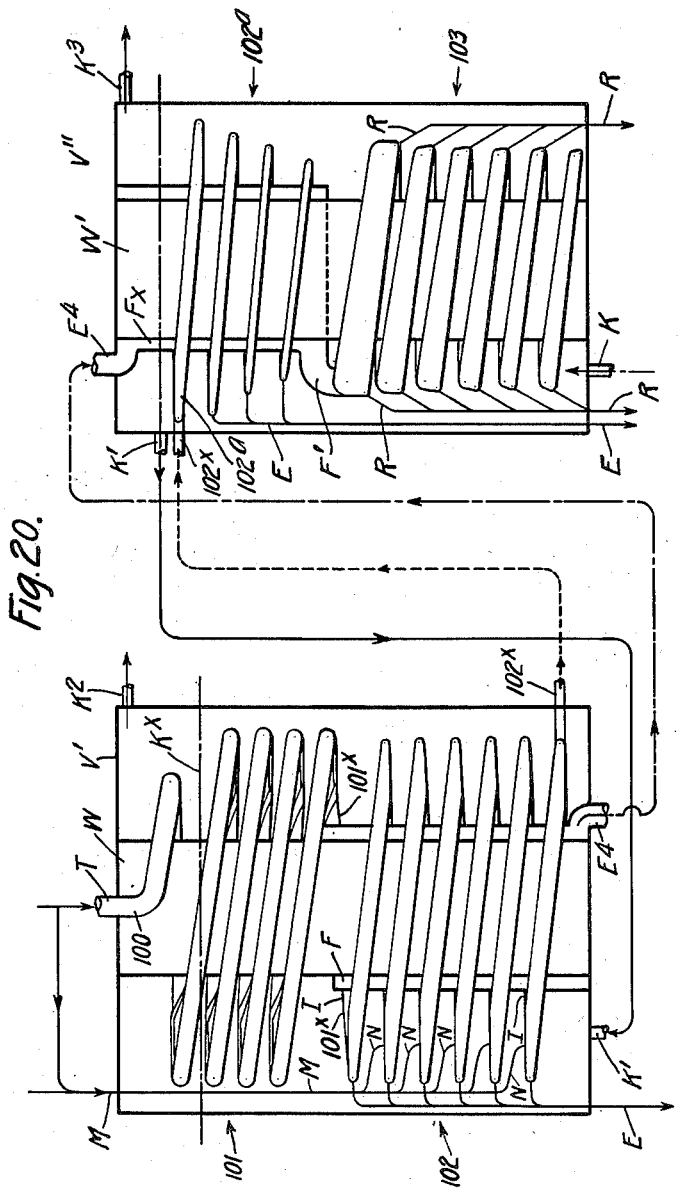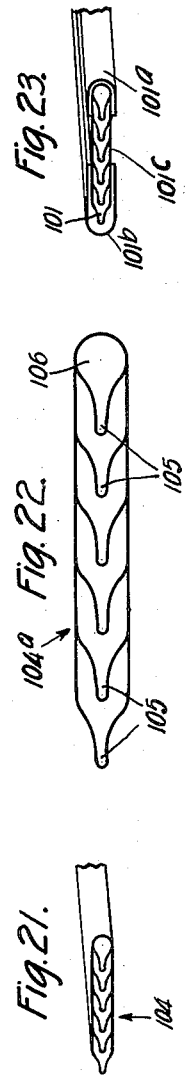

April 28, 1942.    J. LOUMIET ET LAVIGNE    2,281,065
FLUID SEPARATION
Filed Dec. 17, 1936    5 Sheets-Sheet 5

INVENTOR.
Jean Loumiet et Lavigne
BY Moses + Nolte
ATTORNEYS

Patented Apr. 28, 1942

2,281,065

UNITED STATES PATENT OFFICE 2,281,065

FLUID SEPARATION

Jean Loumiet et Lavigne, Playa de la Teja, Itabo, Cuba

Application December 17, 1936, Serial No. 116,333
In Cuba May 14, 1936

14 Claims. (Cl. 62—175.5)

This invention, in its most specific aspect relates to the separation of the constituents of a fluid mixture having one constituent which is of greater density than the other and which is also condensible at a higher temperature than the other. The invention finds useful application, for example, in the separation of water from alcohol and in other similar operations, but it also has a special utility in the separation of gases which must be separated at a very low temperature such as the gaseous constituents of the atmosphere. The principle of the invention will be first outlined in connection with the last mentioned application and then the separate utility of certain novel features will be referred to. The invention resides primarily in the method, but comprehends also mechanical structures which are useful in practicing the method.

In accordance with a practical and advantageous method typical of the invention the mixed gases or vapors are expanded into a helical coil, being caused to traverse successive sections of a path defined by the coil at a high velocity. The temperature of the expanded vapor is regulated and controlled with the object of promoting the condensation of the heavier, more readily condensed constituent, while opposing condensation of the lighter constituent. The centrifugal force induced by the travel of the fluid in a curvilinear path promptly throws all condensed liquid toward the outer side of the coil, and effects a partial or preliminary classification within the coil of the uncondensed particles in accordance with their densities. This preliminary classification is effected in the first or introductory section of the coil. The next coil section is subdivided by longitudinal partitions into concentric zones each carrying a roughly classified fraction of the vapor. The condensing, classifying and separating action is continued in each of these zones so that each of them may deliver some liquid from the region of its outer wall, and vapor from the remainder of its cross-section whose particles are better classified than when they entered the zone. The cross-section of the coil is desirably further subdivided in following sections, greater numbers of partitions being provided to produce a greater number of zone divisions.

At each point of redivision there is a regrouping of the vapors; that is to say, the denser vapors delivered by an inner zone and the lighter vapors delivered by an outer zone are delivered together to a single zone of the following section. This principle of rectification and reclassification is continued from point to point, even after the maximum subdivision of the coil in the zones has been effected. Thus, particles which were originally classified improperly are permitted to seek their proper stream, the classification being progressively more perfect as the fluid progresses along the coil. The liquid condensed in an inner zone is also permitted to progress step by step outward until it is all collected in the outermost zone.

Besides the rectifying effect thus mechanically produced, the energy of the flowing fluid is converted frictionally into heat energy for effecting rectification through thermal effects. This is desirably accomplished by interposing frictional resistance to the fluid flow at the outer side of the fluid path, as by making the interior surface of the coil rugose or by constricting the cross-section in that portion of the coil most remote from the axis of the helix. This principle may be applied exclusively in the outermost zone of the coil, or it may be also applied in part or all of the inner zones of a coil section.

As a result of the frictional conversion of energy into heat, the outer portion of the coil wall and the liquid in contact with it are maintained at a higher temperature than the vapor which does not rub against the wall. Consequently, there is a constant tendency to reevaporate more volatile particles which have been condensed, with the result that rectification improves the classification progressively as the fluid travels along the coil. The fact that the outer wall of the coil is heated by the frictionally developed heat enables a lower average temperature to be maintained in the coil than would be the case if the entire coil and its contents were maintained at the same average temperature, since the heat concentrated in the outer portion of the coil section can be more readily absorbed by an external cooling medium of given temperature.

While all of the features referred to cooperate effectively to produce a highly advantageous, unitary result in the specific application discussed above, it should be noted that this specific application involves several procedures which are individually novel and useful.

The conversion of energy into heat through friction and the external absorption of the heat is, for example, highly useful in the securement of very low temperature, quite independently of any condensing action or even of any separating action. This feature is not claimed herein, but is claimed in my divisional application Serial No.

304,761, filed November 16, 1939, for Production of cold.

The mechanical rectification secured by zoning and rezoning the coil is useful independently of the cooling and rectification secured by the frictional conversion of energy into heat.

The thermal rectification secured by frictional conversion of energy into heat is useful independently of the mechanical rectification, and also independently of any attempt to secure a very low temperature.

Important features of the invention relate to apparatus for producing thermal rectification, mechanical rectification, or both; also to apparatus for securing a low temperature independently of separation or rectification.

Other objects and features of the invention will appear as the description of the particular physical embodiment selected to illustrate the present invention progresses.

In the accompanying drawings, like characters of reference have been applied to corresponding parts throughout the several views making up the drawings, in which:

Fig. 1 is a view in plan of a helical separator coil in the construction of which certain features of the present invention have been embodied;

Fig. 2 is a view thereof in side elevation;

Fig. 3 is a fragmentary detail view of a schematic character in sectional plan, of an individual convolution corresponding in general position to the lowest convolution of the coil shown in Fig. 2 but of a modified construction which will be described;

Fig. 4 is a view in schematic form illustrating in vertical section typical cross-sections of a tubular component of the structure shown in Fig. 1, at different stages of separation, these sections being taken respectively on the lines 4a, 4b and 4c;

Fig. 5 is a schematic view in sectional plan of one complete convolution of the coil shown in Fig. 2 being that convolution the ends of which are defined by the reference characters 5—5 in Fig. 2;

Fig. 6 is a view similar to Fig. 5, illustrating a modification of the division into zones, and also showing extraction tubes;

Fig. 7 is a similar view, illustrating a further modification of the sub-division into zones;

Fig. 8 is a similar view illustrating still another modification of the zone arrangement and of the extraction tubes;

Fig. 9 is a schematic plan view, similar to Fig. 1, of a modified form of helical structure in the construction of which the invention has been embodied;

Fig. 10 is a schematic view of horizontal section illustrating devices projecting into a zone from an adjacent zone, for rectifying the classification of the liquids of different densities;

Fig. 11 is a fragmentary detail view in horizontal section on a much larger scale of that part of one helical convolution of the structure which is shown in Fig. 10, and also showing the scoop or rectifying device and its associated parts in detail;

Fig. 12 is a transverse sectional view on the line 12—12 of Fig. 11;

Figs. 13, 14, 15 and 16 are views of a character similar to Fig. 12, showing various typical cross-sections of the convolutions composing the tubular component of a helical separator structure in the fabrication of which this invention has been embodied;

Figs. 17, 18 and 19 are segmental views in detail, each illustrating a fragment of one convolution of a coil in which zones are disposed in different arrangements;

Fig. 20 is a schematic view of a rectifying apparatus for distilling by multiple effects, in the construction of which the present invention has been embodied;

Figs. 21, 22 and 23 are fragmentary, detail views similar to Fig. 12, and showing modified zones in a tubular convolution of the apparatus illustrated in Fig. 20;

Fig. 24 is a schematic sectional view of a complete convolution similar in general arrangement to that of Fig. 10 but modified as to details of the zone structure, and of the extractor tubes;

Fig. 25 is a similar view of another modification;

Fig. 26 is a similar view of still another modification;

Fig. 27 is a fragmentary, detail view in vertical section on the line 27—27 of Fig. 28;

Fig. 28 is a fragmentary, detail view in vertical section on the line 28—28 of Fig. 26.

Figure 29:
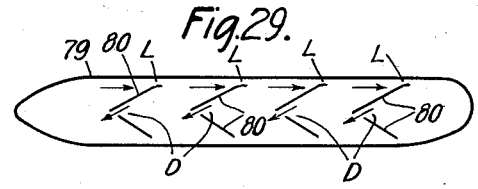
Figs. 29, 30, 31 and 32 illustrate, each in vertical section, details of rectifying partitions or baffle members each form of which represents a different disposition of the members within a cross-sectional area of one convolution of a rectifying coil.

In describing the now-preferred embodiment of the invention selected for illustration and description, the invention will be considered first in its broad, generic aspect, as providing a helical tubular structure in which the tubular coil or component is made with a bore the typical cross-section of which is formed with its longest dimension in the direction of its breadth, that is to say transversely with respect to the main upright axis of the helical structure, and so is disposed approximately in the direction of the resultant of the centrifugal and gravity forces acting upon the fluid, it being understood at the outset that this typical cross-section is intended to be modified as may prove to be desirable to favor each specific case of separation; and various illustrative examples of such modifications are shown; and will be described in sufficient detail, to permit a complete understanding of the way in which the invention is to be carried into effect.

Referring first to the coil or helical structure, which is designated generally by the reference character H throughout the drawings, regardless of its particular shape in any specific embodiment of the invention, this helical structure is shown in Figs. 1, 2 etc., as having a terminal portion T of generally circular section, to facilitate its connection to a conventional supply pipe, and from the round terminal T the tube is gradually broadened in a radial direction and made correspondingly thinner, while maintaining a constant mean area, until it can be regarded as divided into at least two zones extending lengthwise of the tube, viz., an outer zone, designated generally S' throughout the drawings, being that portion of the bore most remote from the axis A of the helical structure, and an inner zone, designated generally S'' throughout the drawings, being that portion of the bore nearest said axis.

For the purpose of compactness in illustration, the length of convolution of the component tube comprised in the part from T to S, (the character S indicating the region at which the typical cross-sectional form of the bore, as shown in the middle portion of Fig. 4, becomes established,) has been shown as relatively short, but in actual practice that length will preferably be of sufficient extent to permit a good initial classification of the fluid stream, so that the mixture running through the outer zone may contain the greater part of the fluid, or of the impurities, of greater density, and so that the greater part of the lighter or less dense elements will be found within the inner zone.

The above initial classification of components of the fluid stream having been so effected, the bore of the coil is made progressively broader and thinner, usually without change of mean cross-sectional area, in order to permit further classification of the components of the fluid stream, and to permit, when desirable, their individual segregation, as, for example, into several zones, such as indicated at 4b and 4c in Fig. 4.

Such subdivision should only be effected when the initial classification of the component fluids has been accomplished to an extent adequate to permit the separation of quite distinct mixtures in the new divisions, the initial treatment having been carried out with due regard to the condition of impurity of the fluid, its viscosity, and difference in density and in rate of travel of the fluid stream.

In due course, following the same principle, the cross-sectional shape of the bore may be still further broadened and thinned, while maintaining its mean area, to permit further classification and subdivision into zones by means of suitable partitions, four zones are shown at S4 in Fig. 1; five at S5; and six at S6.

By following another mode of subdivision each zone may be bisected at each subdivision, thus duplicating the zones each time, and Fig. 9 illustrates graphically an example of such subdivision, no detailed description of this figure being considered necessary.

By means of such progressive enlargement in breadth to an indefinite extent, the shape of the tube will finally be brought to the relative breadth and thinness which shall have proved desirable to carry into effect the particular treatment intended for a fluid stream of given characteristics, the bore of the tube being divided and subdivided lengthwise by partition into zones having divisions which will conform in number, in length, and in cross-section, to the desired treatment to be effected, the separation and segregation of fluid components being progressive to effect the disposition of the denser fluid components progressively outward, in proportion to their relative density.

It is to be noted that the system of division and subdivision may be modified in the respect that, as illustrated in Fig. 9 the early classifications may be carried on to a substantial extent by means of the simultaneous broadening and thinning of the bore, always maintaining its mean cross-sectional area without dividing the bore into sectors by physical partitions. Once this result has been obtained and the classification of the fluid components has been effected to a satisfactory extent in a given section of the tube, the bore may be so divided into various zones as to provide for the successive separation, in such zones, of fluid components of a relative density which increases progressively from that of the fluid in the zone nearest the axis, to that in the zone most remote from said axis.

Such division and separation can be effected either at the same time, or preferably in various operations, as by dividing the original area of the bore first into two or three zones, as shown in Fig. 1 and then by subdividing those zones afterwards in the manner hereinafter described. Fig. 9 shows the division of the original bore into eight zones by means of three successive partitionings, in each of which a zone is bisected, as at 51, 52 and 53.

Having obtained, in the manner above described, the division of the bore of the helical tube into zones, and thereby provided for the initial classification of the fluid stream in those zones, and also for further division to the desired degree of subdivision, there remains to be carried into effect another important object of the invention, comprising the step of rectification of the classified fluid components of the stream.

By this step, provision is made for inducing the return to their appropriate zones of fluid components which have been diverted therefrom by unintended displacement in the course of the preceding step or steps of classification and separation; the general purpose of each rectification being to concentrate the denser bodies in the outermost zone, and the least dense components in the innermost zone.

Such rectification, in pursuance of this object of the invention, is accomplished by inducing contact between the denser fluid flowing in a relatively remote zone with the relatively less dense fluid flowing in the next inner zone of the system.

The preferred means to effect such contact of the fluid components to be rectified comprises the disposition of each partition by which a new pair of zones is formed in the system, in such fashion that the end of each such partition extends between the adjacent walls of the next anterior zone, i. e., the one from which issues the stream to be divided, as for example, by the arrangement of the partition ends as at the regions 62, 63 and 64 in Fig. 5, so that each of the new zones, at each such region is fed by a predetermined portion of the fluid components flowing out of the anterior zone, the denser fluid component passing into the new outer zone and the lighter fluid component passing into the inner new zone.

In each of the above new zones, the new fluid streams produced from those mixtures become again classified, their denser components seeking the outer portion of the new zone, and their lighter components entering the inner portion of the new zone; and each new zone will be made of a length suitable to permit the completion of this step of the rectification operation; another subdivision of a similar nature being similarly effected, as at 59 and 60, by partitions disposed in the leading end of each of the zones 57 and 58.

This disposition of successive partitions in the system of zones gives an opportunity for any portions of the denser fluid which may have become entrained in the dominantly lighter body of an inner stream, in the course of earlier classification, to readjust themselves by emigration from the lighter stream, into a denser flow exterior thereto; and there is of course a reciprocal emigration of the lighter particles from an outer to an inner zone.

The organization of the subdivisions according to the system last described, and illustrated in Figs. 6 and 7, provides for carrying into effect definitely the desired process of rectification concurrently with the classification hereinbefore described in detail.

Referring now to Fig. 5, which represents a section of the convolution 60 in Fig. 2, the fluid enters at the region represented by the section line 61, and at each quarter of the spiral, as at 62, 63 and 64, there is a further modification of the interior zones. It may be noted, however, that this quartering is merely illustrative, and that in practically all cases the fluid stream should be caused to travel through a longer stretch of each new modification of the internal structure in order to insure the performance of a re-classification adequate to justify another change of divisions.

It is also noteworthy that in Fig. 5 the new divisions of each pair are established approximately in the middle end of each anterior zone, although that disposition of each partition may be modified for the purpose of admitting from the anterior inner zone into the new zone such a proportion of the denser fluid components as may be regarded as more suitable; and for admitting from the anterior exterior zone a suitable portion of the lighter fluid which also feeds it.

The divisions which the new zones establish may be arranged to penetrate into the anterior zones, as shown in Fig. 5, and also as shown at 165 in Figs. 18 and 19, or can begin where the anterior zones end, as shown at 65 in Fig. 6; or they may be spaced somewhat from those ends, as shown in Fig. 17 and Fig. 18 at 65x; or the disposition may be partly according to one such arrangement, and partly according to another, as also illustrated in Figs. 22 and 23.

In each case the divisions of the various zones may begin at the same point of each convolution, or at different points, as shown respectively in Fig. 9.

Such modifications do not vary in any essential respect the embodiment of the underlying idea of means of the invention.

Rectifying operations may be effected without modifying the division into zones already described, by collecting the heavier part of the dense fluid of a zone S'', as at 66 in Fig. 11, and injecting it into the adjacent outer zone S'; also by collecting, as at 67, the lighter component flowing in said outer zone S' and injecting it into the aforesaid neighboring inner zone S''. Figs. 10, 11 and 12 illustrate a now-preferred form of means by which such a rectification can desirably be accomplished, for example, in the instance of a gas or vapor which it is desired to separate from a liquid which it carries, as in the case of a centrifugal distillation.

In general structure, the apparatus used for the last-named purpose may be as illustrated in Fig. 10 and its structural details are shown in Figs. 11 and 12, in which a scoop or stripper device 67 projects into the path of the lighter fluid component flowing through the zone S', and deflects or diverts it into the zone S'' while the small tube 66, inserted in the small channel 68 which the zone S'' forms at its outer end, collects and carries into the zone S' the liquid separated in the zone S'' and which accumulates in said small channel 68.

Other means for the above purpose may be adopted as devised and found suitable by those skilled in the art, as the particular physical embodiments selected for illustration herein do not exhaust the possible physical embodiments of the idea of means underlying the present invention.

Having established within the successive zones of the helical structure, by means of the primary classification and the subsequent rectification, a graduation of the fluid components progressively denser from the inner zones outwardly, the method of the present invention may be carried into effect for the further purpose of accomplishing the separation of such fluids as that by which the separator system is fed; and for that purpose these fluids are to be separated and injected into one of the central intermediate zones; and in proportion to the quantities so injected respectively heavy fluids will be extracted from an outer zone of such a system and light fluids from a zone nearer the axis of the helical structure.

In Figs. 26, 27 and 28 a means for effecting the last-named extractions is illustrated, which means includes an enlargement, as at 70, of the central zone 71 where it is to receive the injection of the fluids to be separated, the latter being supplied through an injector pipe or nozzle I. The divisions of the successive zones are so modified that they preserve a mean cross-sectional area, except at their ends, which are somewhat reduced in size, the reductions corresponding to the extractions of fluid components which may be effected.

Afterwards, rectifying operations are effected, by means of which the division of the bore into zones as initially disposed is re-established, and the classification of the fluid components is completed. When that classification has proceeded sufficiently far, a new injection and new extraction are effected.

Fig. 26 illustrates in schematic section, a convolution of the helical structure, shown as flat, for the purpose of illustration, and Fig. 27 is a fragmentary detail view in vertical section on the line 27—27 of Fig. 28; Fig. 28 being a similar vertical sectional detail on the line 28—28 of Fig. 26.

In these figures, the injection tube, as already noted, is designated I; that for the extraction of dense fluid E' and that for the extraction of light fluid E'', the character E designating the main discharge pipe of the system.

The rectification operation, according to the above description, may be regarded as accomplished in one complete convolution of the helical structure, between successive injections, but it is to be understood that these dispositions are susceptible of extensive variations, according to the requirements of particular extractions, and that the frequency of the injections must depend upon the condition of the fluid, upon the nature of the separation, upon the completeness of extraction required, and upon the velocity of the fluid.

In Figure 25 a modified form of means is illustrated for effecting the injection and other operations without modifying the interior section of the tube, this modification of method consisting primarily in deflecting toward an adjacent outer zone any denser fluid components flowing in a given zone 72, as at 73, and deflecting toward an adjacent inner zone, as at 74, the lighter fluid component flowing in the zone 72.

The length of that part of the coil designed for separation of the newly injected fluid will be determined in each instance by the character and requirements of the extraction to be effected, and in general such modifications may be adopted as will occur to those skilled in the art, without departing from the idea of means which underlies the invention.

In further pursuance of the invention, a means is provided for the eventual disposition of the classified basic fluid which runs through that part of the helical structure posterior to that devoted to the injection and extraction operations above described, and which basic fluid constitutes the instrument of separation utilized in the aforesaid steps of injection and extraction.

In the last-named step of provision for eventual disposal, it may be found convenient in some cases to continue using said basic fluid and to feed the coil by recirculation thereof, and for that purpose the used fluid may be at first pumped from the part of the coil designed for separation of newly injected fluid, i. e., after the primary rectification, and before initiating the extractions. Separate pumping facilities will be provided for each zone, and the provisional feeding to the injector will be suppressed as soon as self-feeding has been established, closing the cycle of the operation; also suppressing, in consequence, the operations in that part of the coil anterior to the place where the pumping is effected.

It is to be noted that the circulation of the united fluids described from a group of zones which originated in a primitive zone can also be effected by pumping the united fluids from such zones into that primitive zone, or finally the totality of the mixed fluids can be pumped at the intake of the coil, as at T (see Figs. 1 and 2). Generally, however, it will be more practical to dispose of those circulating fluids by carrying the separation of their fluid components through to a degree of completeness which results in their discharge individually for further use.

Inasmuch as, in this case, there is a cessation of feeding movement of the fluids, for injection into the coil of the fluids to be separated, the volume of the total fluid in circulation, or available for circulation, is diminished by the extractions of separated light and dense fluid components which shall have been effected; and, in order to maintain the velocity of travel of that fluid, it is necessary to reduce also the cross-sectional area of the bore of the coil tube. That reduction can be obtained by diminishing its thickness, and maintaining its breadth, or by diminishing its breadth and maintaining its thickness; or by diminishing both of its cross-sectional dimensions.

In Fig. 6 is shown schematically an instance in which the breadth of the tube is maintained while the thickness is diminished. All of the extractions of the light fluid through E″ and E3 are united in a single discharge pipe E, while the exterior extractions are effected through a peripheral pipe E′ and another pipe Ex. These extractions can be effected in such a manner as to absorb the totality of the fluids from the sector, as at E3 and E′, or only such selected parts thereof as may be drawn off at E″ and Ex.

Fig. 7 illustrates an example of diminishing the breadth of the bore S6 while at the same time retaining or not retaining its thickness undiminished. In this instance the breadth of each of the zones is also reduced, as at Sx, so as to maintain the same number of zones.

After each extraction, referring both to the instance illustrated in Fig. 6 and to that in Fig. 7, the residual fluid in the zone is subjected again to a rectification before effecting a new extraction, the coil presenting again those changes of section which are characteristic of a structure designed to effect rectification, mixing the dense fluids of each zone with the light fluids of the next outer zone; and the interval between two successive extractions is determined by the need for a certain amount of travel, so that the fluid may become sufficiently rectified to accomplish the purpose sought by the separation.

It will be understood, of course, that inasmuch as Figs. 6 and 7 are only schematic in character they are intended to suggest symbolically the nature of the step performed and do not show actual structure in detail. In each instance of separation the requirements will be found to be different and the actual structure will be varied by those skilled in the art to meet the particular requirements encountered in the practice of the novel method herein disclosed.

When, by virtue of the successive extractions, the thickness of the pipe has been reduced to the minimum practically possible, and its breadth to the minimum allowed for the maintenance of the same number of zones, it is unavoidable, in order to dispose of the residual fluid, to diminish, gradually the number of sectors in the same measure that the extractions are being effected.

Figs. 3 and 8 illustrate how that disposal can be effected, provision having been made in the structure thereof for effecting a new rectification of the fluid after each extraction, these figures having the same schematic character already noted. In Fig. 3, the number of zones shown at S7 is reduced in number to a single zone at S8.

In Fig. 8 the larger number of zones at the central portion of the system is reduced to three zones S9 at the periphery and three zones S10 at the central portion, the extractions having been effected at S12.

It will be understood that the rectification may be performed in a considerably larger space than that represented in the last-named figures, since, after each extraction, there should be allowed an ample period for completion of the analysis of the total.

While the process has been described, thus far, in its application to the separation of two fluids of different densities, such for example as used lubricating oils which are to be purified, and such as the mechanical purification of raw petroleum, etc., it can be utilized for other purposes, as for example, in the defecation of sugar cane juice, in which instance the impurities which must be separated include substances denser than the juice, constituting a heavy scum, and lighter substances which constitute a light scum.

As applied in this instance, the outermost and innermost extractions will be respectively of heavy scums and of light scums, but the extraction at these extremes will be limited to the separation of those impurities, and when the residual cane juice has been sufficiently purified it can be extracted from the central zone continuously as it reaches the desired condition of purity, and in a manner corresponding to the extractions of the denser and lighter fluids in the instances already described by way of example.

Such extractions will be effected in the central zones at a region shortly anterior to that in which the impure juice is injected, the thickness of the central zones being reduced at the region of such extraction and the typical dimension re-established at the region of injection of the impure fluids.

In place of a segment or group of segments, comprised in the helical structure of a single separating coil, as described, use may be made of several successive, or individualized coils, each one of which would replace a segment or group of segments of the described apparatus and would operate in the manner described, without necessitating any essential change in the principle of operation.

The described process of rectification by means of the type of separating coil which has been described can be carried into effect also by means of a coil which has been modified by disposing the component zones in a discontinuous arrangement, a now-preferred embodiment of this feature of the invention consisting in leaving gaps between the ends of zones at regions where the movement of fluids from one zone to another can take place naturally, namely, at the outer walls, with respect to the curvature of the coil, in order to allow the passage of the denser fluid from one zone to the adjacent outer zone; also at the inner wall, relatively to said curvature of the coil, to favor the passage of the lighter fluid from the zone to an inner immediately adjacent zone.

Figure 30:
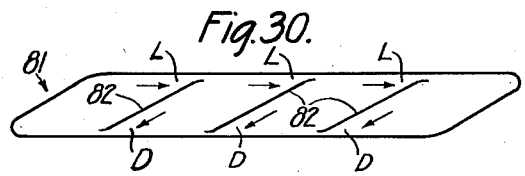
Figure 31:
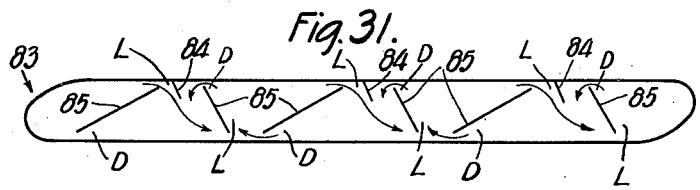

In Figures 24, 30, 31 and 32, openings are illustrated at D in the dividing partitions 80 of the zones, which may permit the passage of the denser fluids outwardly, in the direction of the arrows, while other openings, indicated by the characters L, may permit the passage of the light fluids inwardly as indicated by other arrows. In Fig. 29 the trend of movement outwardly is between partitions 80 disposed in herringbone arrangement, and the inward trend follows the side wall 79. In Fig. 30 the arrangement of partitions 82 in the segment 81 is different, as indicated clearly, with a corresponding variation in the trend indicated by arrows D and L respectively. Another arrangement is shown in Fig. 31, in the segment 83, and still another in Fig. 32, in all of which the same characters designate like movements of the denser and lighter fluids respectively, the denser being indicated by the character D wherever found, and the lighter by L.

In the arrangement of Fig. 31, it is to be noted that the streams are biased into collision with each other, by the partitions 84 and 85, thus favoring their rectification, this arrangement being designed especially for use in the alcoholic distillation. The condensed liquids separated in each zone are gathered in the necks formed at the exterior ends of each of those zones as indicated by the letters D, in order to empty the liquids into the adjoining outer zone, while a passage, indicated by the letter L, is left at the interior ends of each of the same zones for the vapors not condensed.

Figure 32:
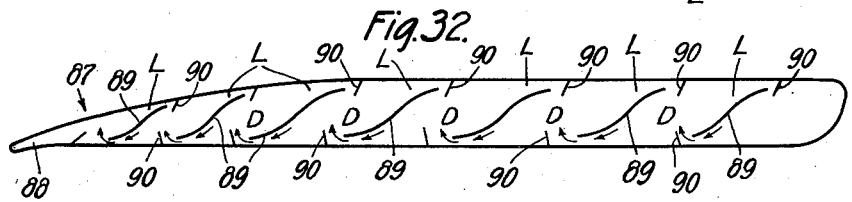

In Fig. 32 the segment 86 becomes narrower toward its outer end 87, to reduce the alcoholic vapor in contact with the liquid, and it ends in a narrow deep channel 88 slightly inclined downwardly as it becomes deeper, at which region the extractions are effected (by suitable pipes not shown). The partitions 89 may desirably be of ogee shape, as illustrated, with shorter straight baffles 90 near the necks.

The rectification in such coils as those illustrated in Figs. 29–32 is continuous, and is produced in a constant manner by the movement of the dense fluids toward the outer zones through the openings D, and by the movement of the light fluids toward the inner zones through the openings L. Coils for the above purpose are characterized by unchanging disposition of the zones throughout the portions devoted to rectification, so that the rectification is not affected by extracting the lighter and denser fluids from one zone and injecting them respectively into adjoining inner and outer zones.

A further modification of the method of rectification that can be made while adhering to the underlying idea of means which characterizes this invention, comprises the provision of a coil with a bore of broad and thin section, not divided into zones, and in which, after a sufficiently complete classification of the fluid components derived by analysis from the initial fluid, a new fluid is injected at about the center of the section. Those injections must be made in the direction of the travel of the circulating fluid.

An outstanding object of the present invention, as already stated briefly, is to provide for the combined use of my improved methods in a novel rectifying apparatus for centrifugal distillation which is, in certain aspects, an improvement upon the apparatus for carrying into effect the method disclosed in my aforesaid co-pending application.

In particular, it is designed to improve upon the earlier invention in the important respect that provision is made for the production, by means carrying into effect a process of distillation by centrifugal force, for obtaining a single product, as for example alcohol, free from entrainments of oils and watery or other impurities, and more particularly for obtaining in the first separation as much alcohol as possible, in order to avoid the need for repeated evaporation of mixtures resulting from incomplete separation, and containing substantial quantities of alcohol.

In pursuance of the above object, a separating coil is provided to which are fed the vapors produced in the evaporation of a liquid to be distilled, such vapors, in the case of alcoholic distillation, constituting a mixture which contains principally alcohol and water.

The purpose of separation in this coil is to separate the alcohol from the water, and to this end the separator coil is cooled, and the cooling induces the condensation of the water, which, being in the liquid state, has a greater density and is therefore more easily separated from the alcohol, which remains in the state of vapor.

The foregoing step may be carried out by the use of a coil formed of a tube having a bore of undivided cross-section but characterized by extension substantially in the direction of the resultant of centrifugal force and gravity, as disclosed in my aforesaid application for Letters Patent; and in the said earlier application mention is made of distillation by multiple effects, to which end the condensation of the alcoholic vapor is obtained by means of cooling it with a fresh supply of liquid to be distilled, subjected to a lower pressure than that of the vapor which is condensed, and which, by reason of the heat which it receives from that vapor which becomes condensed, is itself evaporated.

In order to give a clear understanding of the nature of the operation, the installation of a rectifier will be described, as exemplified by its use as a condenser of the alcoholic vapors coming from a vessel forming part of an apparatus for distillation by multiple effect, said vessel being placed in the next vessel of the same apparatus, for the purpose of heating and evaporating therein the liquid to be distilled in the next following vessel.

Fig. 20 shows a typical arrangement of the apparatus which can be employed desirably for the above purpose in carrying my present invention into effect.

The reference characters V' and V'' designate a pair of tanks, which are provided as separate containers rather than as a single vessel, in order to avoid an excessive difference of pressure as between the upper part and lower part of the liquid to be distilled, such as might result from the use of a single vessel of relatively great height.

In the first tank, V', the intake terminal T of the separating coil, being a pipe of substantially circular section, is bent at 100 to form a spiral which merges into the uppermost convolution 101 of a helical structure in which several such convolutions (four in the instance illustrated) constitute a separating coil through which the supply fluid is circulated and thereby subjected to classification by combined action of centrifugal force and gravity applied in the manner hereinbefore described, each convolution being formed with a bore the cross-section of which is substantially of equal area with that of the feed pipe T but broadened, approximately, in the direction of the resultant of the above forces, and made proportionately thinner to preserve a constant mean cross-sectional area. The coil 101 is desirably divided into segment zones as illustrated in Fig. 1, having the cross-sectional shape in the latter segments which is illustrated in Fig. 16. The wall of the constricted channel found at the lower, outer side of each zone is desirably rugose.

In continuation of the coil 101, which may have more or fewer convolutions than the four shown, connection is made, as at 101X to rectifying convolutions of the series 102, of which there is a suitable number (six in the instance illustrated). The coils 101 and 102 are in effect one coil. The coil 102 is divided by partitions into segment zones. This coil desirably has the cross-sectional shape illustrated in Fig. 16. The wall of the constricted channel formed at the lower, outer side of each zone is desirably rugose. The zone partitions of successive segments are desirably overlapped in some instances and spaced apart in others, as illustrated in Fig. 5, for example.

Regarding as a basic agency of rectification the fluid introduced through T to the coil 101, and analyzed adequately therein to effect its initial classification into dense and lighter components, in the outer and inner zones which extend lengthwise through the respective segments, according to the method of separation first described, this basic fluid stream now passes through the convolutions of coil 102.

A supply pipe M injects into the convolutions 102, through individual feed pipes N the vapors to be rectified, such injections being made to a central zone segment as at 71 in Figs. 26, 16 and 28, and after the rectification step carried on in this coil 102 extraction is made of watery liquid through the pipes E, while the alcohol vapor is extracted through the pipes I, being carried to a cylindrical crown F which is constructed around a central well W.

The crown discharges the vapors into a pipe E4 through which they are delivered to a crown Fx disposed co-axially of a well W' at the upper part of the tank V''.

The fluid circulating in the lowest convolution of coil 102 is carried by a pipe 102X, of the same typical cross-section, to the prolongation 102a in the tank V'', and therein the liquefaction of that fluid proceeds in the manner pointed out hereinbefore in the description of the separator.

Extraction of water at E from the exterior sectors, and delivery of the alcohol vapors to the crown Fx continue concurrently with the classification operation, and all of the alcohol vapors so extracted pass eventually from the crown Fx through a connection F'' into the first convolution of a coil 103, which is preferably of the general form illustrated, described and claimed in my co-pending application Serial No. 99,317, to which reference may be had for a more complete description of its structural details, the purpose of the coil 103 being to condense and separate the alcohol vapors and to extract the condensate through the pipes R.

If the alcohol extracted from the rectifier is not found to be satisfactorily pure, the condensate separated in the first convolutions of the coil 103 can be set apart, or, if necessary, such condensate can be again rectified in a coil like 102 before final condensation in such a coil as 103.

It will, of course, be understood that the illustration in Fig. 20 of apparatus for carrying into effect the feature of the present invention now in course of description is designedly of a schematic character and not intended to reproduce actual structural details, and that the proportions, dimensions, and particularly the number of convolutions in each coil, will generally vary considerably in practice. The coil 102, for example, can be mounted wholly in one tank, or in more than two tanks if so required, and many such modifications can be made by those skilled in the art without departing from the idea of means underlying the present invention.

The liquid which cools the coils, or, in the instance illustrated in Fig. 20, the liquid to be distilled which feeds the tanks at a lower pressure than the basic agent fluid within the coils, enters the tank V'' through its bottom, as at K, ascends therein, being heated and evaporated, and passes over to the tank V' through the pipe K'.

Inasmuch as the temperature of the tank V' is higher than that of the tank V'', it may be serviceable in some instances, namely, when treating mixtures containing enough water—to collect and condense separately the vapors produced in each of the tanks, as through the vents K2 and K3, but when the proportion of water in the vapor is small, the quantity of vapors produced in the first tank is also small, and separate collection and condensation will not be found profitable or necessary.

In Fig. 20, the uppermost convolution of the coil 101 in tank V' is not submerged by the cooling liquid Kx, but it is cooled by the vapor produced in the tank V'. That convolution can be so cooled throughout its surface, or it can be exposed to the cooling medium only at its center, for which purpose the marginal edges are fitted with suitable insulating binding, as 101a and 101b (see Fig. 23). The cooling effect is thus restricted to the mid-section 101c, but if desired the insulation can be extended entirely over the convolution, if desired, from end to end of the convolution. Such insulation can be applied to the entire surface, or any part of the surface of any convolution of any of the submerged coils.

If the cooling be so restricted to the central zones, the condensation will take place only in those zones, and the successive rectifications will transfer the condensate so produced to the outermost zone through a series of contacts with other fluids by virtue of which the more volatile components will be again evaporated. On the other hand, the alcohol travels to the innermost zone through the same rectifying operations at the contact of the liquids separated in the zones nearer to the axis of the helical structure, which also purify it and condense its less volatile components.

The alcohol vapor and the separated water are extracted respectively in the manner pointed out in the description of the separator.

In certain instances the congestion of condensed products can be prevented by total insulation of one or more parts of the separation, to protect them from the cooling medium.

I have disclosed what I believe at present to be the best physical embodiments of means for carrying into effect satisfactorily the invention of my present disclosure, as a solution for the problem of providing a continuous and complete rectification by centrifugal separation in place of the processes to which reference has already been made as characterized by discontinuity and incompleteness of operation. As a characteristic of the present invention I have described a rectifying means comprising a coil section which effects the rectification by means of a novel disposition of zones extending lengthwise through the bore of the tubular component of the coil, and by means of the transfer of fluids from one zone into a neighboring zone.

It is, however, to be well understood that various other physical embodiments of the underlying idea of means can be adopted without departing from the spirit of the invention provided that there be established, in the helical structure, gradations of fluids characterized by an increase in purity progressing successively from the exterior to the interior, or that the method of gradation be utilized as a means to rectify fluids which are injected freshly toward the center of a zone.

Various shapes may be given to the zones and examples of such shapes have already been referred to as illustrated in Figs. 12, 13, 14, 15 and 16 of the drawings. Others are shown in Figs. 21 and 22, and in these the tube wall is designated by the reference character 105, each of these being formed with a flange-like extension which extends away from the axis of the helical structure and is so attenuated as to exert a strongly retardant effect upon the moiety of the fluid stream wedged thereinto by centrifugal force, creating sufficient friction to heat the fluid as well as the walls of the flange. The frictional effect can be increased by making said walls rugose.

As a result of the heating, the more volatile part of the fluid is evaporated, and it becomes lighter as its temperature increases, so that it retreats toward the interior of the zone in accordance with the rule of classification already explained.

The second effect is to produce a cooling of the fluid which circulates in the zone, as explained more at length hereinbefore, and by cooling the vapor circulating in the zone induces the condensation of the less volatile part of that vapor, i. e. of the water which it contains, thus permitting centrifugal force to operate upon the water to separate it, Accordingly, the condensation of the less volatile parts from the vapor and their separation toward the exterior by centrifugal action; and the evaporation of more volatile parts of the separated liquid, and return of this vapor to the interior of the coil; constitute two results of the friction produced in each zone channel 105, and these cooperating results represent rectification operations which tend to improve the separation that takes place in each zone between the alcohol and water.

I have described what I believe to be the best embodiments of my invention. I do not wish, however, to be confined to the embodiments shown, but what I desire to cover by Letters Patent is set forth in the appended claims.

I claim:

1. The method of separating a fluid into component parts mechanically and by fractional condensation which comprises expanding the fluid in vapor form while compelling it to travel at high velocity in a helical path under heat conditions designed to condense the denser component, and said path being so formed as to oppose high frictional resistance to flow of the fluid at the outer side of the path for converting some of the energy of the fluid frictionally into heat and causing the reevaporation of a condensed portion of the lighter component.

2. The method of separating a fluid stream into component parts as set forth in claim 1 which further includes dividing the fluid when it has been preliminarily classified by centrifugal action occurring in the first portion of the helical path, subdividing the stream at intervals along the helical path, and in each instance opposing a high frictional resistance to flow at the outer side of the path of each subdivision.

3. An apparatus for separating a flowing stream of composite into a plurality of constituent parts according to the relative densities of the several particles in each constituent, comprising a helically coiled tube, the bore of said tube being characterized for at least a part of its length by having, in cross-section, greater breadth than thickness, its major cross-sectional axis being disposed approximately in the direction of the resultant of the centrifugal and gravity forces acting upon said flowing stream, and said bore being composed lengthwise of successive segments, at least one of said segments being partitioned into arcuate segment zones adapted to receive and segregate the fluid components classified by the action of said forces within a preceding segment of said coil, and to deliver said components, further subdivided, for contact within the coil of adjacent portions of the output of each two adjacent segment zones.

4. Apparatus as claimed in claim 3, in which the coil comprises numerous convolutions coiled progressively with respect to the main helical axis, and includes an intake convolution or convolutions having a bore portion of substantially circular cross-section in which a primary classification and separation of the fluid components is effected.

5. Apparatus as claimed in claim 3, in which a plurality of successive zoned segments are provided, the successive segments being differently zoned with radial overlapping of zones in one or more segments, at least, to cause re-division of the output of the first segment in the second segment.

6. Apparatus as claimed in claim 3 in which a plurality of successive zoned segments are provided, and in which the first partitioned segment is formed with two zones and each succeeding segment is formed with a greater number of zones until a desired maximum is attained.

7. Apparatus as claimed in claim 3 in which a plurality of successive zoned segments are provided, the successive segments being differently zoned, and in which the zone partitions of successive segments in one or more instances, at least, are overlapped circumferentially of the coil.

8. Apparatus as claimed in claim 3 in which a plurality of successive zoned segments are provided, the successive segments being differently zoned and in which adjacent ends of zone partitions of successive zone segments are in one or more instances, at least, spaced circumferentially of the coil.

9. Apparatus as claimed in claim 3 in which a plurality of successive zoned segments are provided, the successive segments being differently zoned, in which certain segments include inner, outer and intermediate zones and in which each intermediate zone of each such segment other than the last discharges into two zones of the next following segment.

10. Procedure in a method of separating a fluid stream into component parts comprising particles classified according to their densities, which comprises transmitting the fluid stream at high velocity while confining it to a helical path, to subject the fluid stream to centrifugal force, while first effecting a preliminary classification, then effecting a division of the stream into two or more concentric, subsidiary fluid streams of different average densities, and thereafter effecting a redivision of the fluid into new, concentric, inner, outer and intermediate subsidiary fluid streams, each of a different average density from any of the others, to improve the classification, all while continuing the flow of the fluid in the helical path, such redivision comprising the dividing of each of two adjacent subsidiary streams into inner and outer portions of different average densities, and the merging of the outer portion of the inner stream with the inner portion of the outer stream to form a new intermediate composite subsidiary stream.

11. Procedure as claimed in claim 10 in which method a stream composed of relatively dense fluid particles and a stream composed of relatively light fluid particles are flowed continuously in juxtaposition with an intermediate stream or streams of intermediate average density, said method comprising the step of injecting into an intermediate stream an addition of fresh fluid to be classified, and the step of extracting concurrently one or more of the classified fluid components.

12. Procedure as claimed in claim 10 in which method a stream composed of relatively dense fluid particles and a stream composed of relatively light fluid particles are flowed continuously in juxtaposition with an intermediate stream or streams of intermediate average density, said method comprising the step of injecting into said intermediate stream an addition of fresh fluid to be classified, separately discharging the innermost and outermost streams, and returning the products of the intermediate stream for reprocessing.

13. The method as set forth in claim 11 in which redivision as described is repeatedly effected, whereby progressive or step-by-step transfer is brought about of particles improperly entrained in an alien stream, each to its appropriate stream.

14. The method of separating a fluid into component parts mechanically and by fractional condensation which comprises expanding the fluid in vapor form while compelling it to travel at high velocity in a helical path under heat conditions designed to condense the denser component, said path being so formed as to oppose a high frictional resistance to flow of the fluid at the outer side of the path for converting some of the energy of the fluid into heat and thereby creating a temperature gradient crosswise of the tube and causing the reevaporation of a condensed portion of the lighter component which is thrown to the outer side of the path while condensation of the denser component in the cooler part of the path is promoted, and extracting a part at least of the heat of vaporization given up by the condensed fluid and of the frictionally developed heat.

JEAN LOUMIET ET LAVIGNE.

CERTIFICATE OF CORRECTION.

Patent No. 2,281,065.                                           April 28, 1942.

JEAN LOUMIET et LAVIGNE.

It is hereby certified that error appears in the printed specification of the above numbered patent requiring correction as follows: Page 8, second column, line 35, claim 2, after "path" insert --further--; line 71, claim 5, for "segments" read --instances--; page 9, second column, line 23, claim 13, for "claim 11" read --claim 10--; and that the said Letters Patent should be read with this correction therein that the same may conform to the record of the case in the Patent Office.

Signed and sealed this 16th day of March, A. D. 1943.

(Seal)

Henry Van Arsdale,
Acting Commissioner of Patents.